S. T. SKEEN.
DRILL.
APPLICATION FILED FEB. 26, 1915.
1,180,550. Patented Apr. 25, 1916.
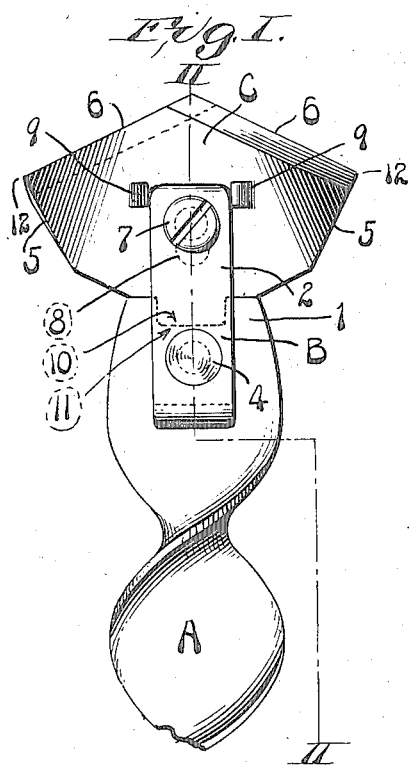
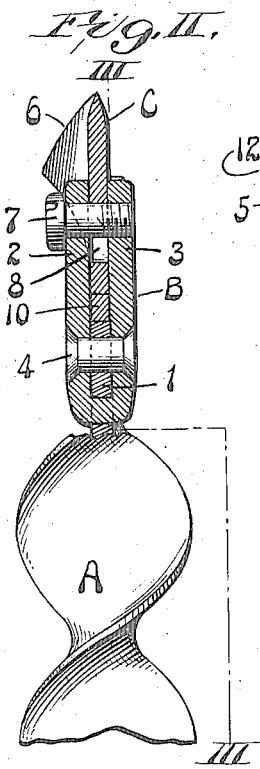
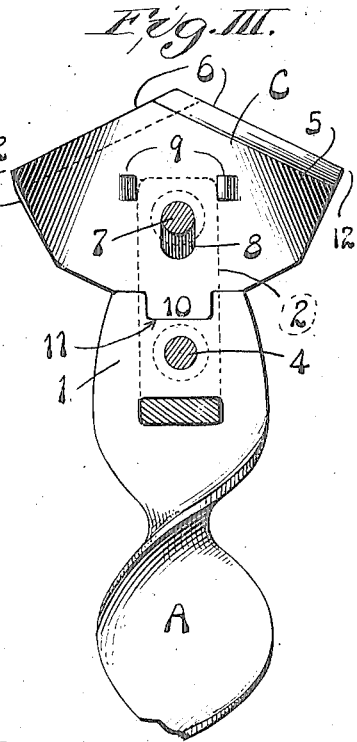
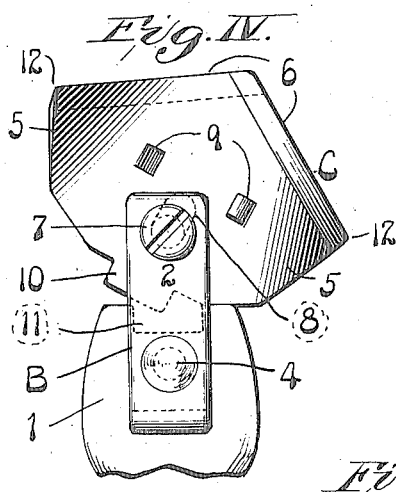
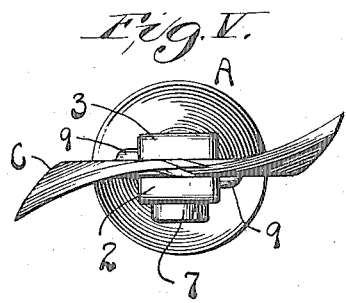
Attest:
W. H. Scott.
A. J. McCauley.
Inventor:
S. T. Skeen
by Knight & Cook
Attys.

UNITED STATES PATENT OFFICE.

SAMUEL T. SKEEN, OF SANDOVAL, ILLINOIS.

DRILL.

1,180,550.

Specification of Letters Patent.

Patented Apr. 25, 1916.

Application filed February 26, 1915. Serial No. 10,654.

*To all whom it may concern:*

Be it known that I, SAMUEL T. SKEEN, a citizen of the United States of America, residing at Sandoval, in the county of Marion, State of Illinois, have invented certain new and useful Improvements in Drills, of which the following is a full, clear, and exact description, reference being had to the accompanying drawings, forming a part of this specification.

My invention relates to a drill particularly adapted for use in drilling into coal deposits, the main object being to produce an extremely simple and highly efficient drill of this kind.

Another object is to provide an inexpensive drill which is so constructed that it can be easily released from coal deposits and readily withdrawn from the hole after the drilling operation.

A further object is to produce a simple drill having a tiltable blade which will automatically assume an extended position, and become positively locked in such position at the beginning of the drilling operation.

The ordinary coal drill will frequently become wedged in the hole during the drilling operation, by striking sulfur or other material which causes the drill to be diverted laterally, thereby binding the drill tightly in the hole so that considerable labor is required to withdraw the drill. The simple blade of my drill will readily tilt during the withdrawal of the drill, so as to release the blade from an irregular hole and also to permit the blade to pass hard projections which are frequently present in the holes after the drilling operations.

In drilling a hole with an ordinary miner's drill, a tapered hole is frequently produced by reason of the cutting edges being worn during the drilling operation. A hole so formed is very difficult to tamp, as the tamping material will wedge in the tapered hole, and air spaces will be present behind the tamped material. To avoid "false tamping" a small hole may be drilled by using a blade having its corners worn away, and thereafter continuing the operation by the use of a large blade which will pass into the small hole, engage the material at the inner end of said hole, and then expand to drill a large hole which forms a continuation of the small one. My drill is so constructed that its blade may be tilted to pass into the small hole referred to, and when it reaches the inner end of said hole, the drill may be operated with the result of tilting the blade to drill a hole slightly larger in diameter than the first mentioned hole. The tiltable blade is automatically locked in its operative position at the beginning of the drilling operation, but it is free to tilt when the drill is pulled longitudinally to withdraw the blade from the hole.

Another advantage of my drill is that the blade may be readily detached from the drill stem so that a worn blade may be quickly removed and replaced by another blade whenever necessary, without taking the drill stem from the mine to sharpen the blade as is ordinarily done.

Figure I is a top or plan view of a drill embodying the features of my invention. Fig. II is a section taken approximately on the line II—II, Fig. I. Fig. III is a section taken approximately on the line III—III, Fig. II. Fig. IV is a view similar to Fig. I, showing the blade tilted to shift its outer corners toward the axis of the drill. Fig. V is an end view of the drill. Fig. VI is a section illustrating a modification.

A designates a drill stem, preferably in the form of a spiral conveyer having its end 1 flattened to receive a blade holder B which forms part of the drill stem. The blade holder I have shown is preferably, but not essentially, a single piece of metal inserted through the flattened end portion 1 and folded onto said flattened portion to produce a pair of jaws 2 and 3 which extend from the end edge of the spiral member.

4 designates a rivet connecting the blade holder to the flattened portion of the spiral member.

C designates a single blade having a pair of wings 5 which extend in opposite directions from the axis of the blade, said wings being provided with cutting edges 6 which converge toward said axis. The blade is detachably secured to the stem by a pivot pin 7 passing through a slot 8, at the middle portion of the blade, and screwed into the jaw 3. The blade is preferably provided with abutments 9 arranged on opposite sides of its axis, and adapted to engage side edges of the blade holding jaws when the blade occupies the position shown in Figs. I to III. When the drill is in service these abutments 9 serve as means for interlocking the blade with the jaws 2 and 3, thereby preventing the threaded pivot pin 7 from being mutilated. The pivot pin is thus protected from injury so that it may be easily removed to permit the removal of the blade C. The blade is also firmly held in position by a tongue 10 extending from the inner edge of the blade and seated in a notch 11 at the flattened end edge of the spiral member.

The blade C may be released from the notch 11 and tilted to the position shown in Fig. IV, thereby shifting the points 12 toward the axis of the drill. When in this position the blade may be inserted into a hole which is slightly smaller than the hole to be drilled by the blade C, and at the beginning of the drilling operation the blade will automatically return to the position shown in Fig. I. The pivot pin 7, tongue 10, and the walls of notch 11, constitute a centering device for guiding the blade to its operative position when the blade is rotated and forced into engagement with the material to be drilled. When the axis of the blade is alined with the axis of the drill stem, the tongue 10 will slide into notch 11 and the abutments 9 will engage the jaws 2 and 3, thereby firmly securing the blade to the drill stem. The blade is thus firmly interlocked with the drill during the drilling operation, and when the drill is pulled from the hole the blade will tilt freely to pass obstacles which are usually present in the drilled holes.

If desired the blade holder may be formed integral with the drill stem as shown in Fig. VI, instead of being formed by riveting a jaw member thereto. The modification (Fig. VI) comprises blade holding jaws 2' and 3', similar to the jaws 2 and 3, and a stem A' integrally connected to said jaws.

I claim:—

1. A drill comprising a stem provided with a pair of jaws extending beyond the stem, a pivot pin extending transversely in said jaws, a single blade arranged between said jaws, formed with a pair of wings, extending in opposite directions from the axis of the blade, provided with cutting edges which converge toward the axis, and having a longitudinal slot therein through which said pivot pin extends so as to enable the stem to slide longitudinally of the blade and the latter to tilt on the pivot pin, the said blade and said stem being provided with interlocking means.

2. A drill comprising a stem provided with a pair of jaws extending beyond the stem, a pivot pin extending transversely in said jaws, a single blade arranged between said jaws, formed with a pair of wings, extending in opposite directions from the axis of the blade, provided with cutting edges which converge toward the axis, and having a longitudinal slot therein through which said pivot pin extends so as to enable the stem to slide longitudinally of the blade and the latter to tilt on the pivot pin, the said blade and said stem being provided with tongue and notch interlocking means and the blade with abutments adapted to engage the edges of said jaws.

3. A drill comprising a stem provided with a pair of jaws extending beyond the stem, a pivot pin extending transversely in said jaws, a single blade arranged between said jaws, formed with a pair of wings, extending in opposite directions from the axis of the blade, provided with cutting edges which converge toward the axis, and having a longitudinal slot therein through which said pivot pin extends so as to enable the stem to slide longitudinally of the blade and the latter to tilt on the pivot pin, the said blade being provided at its rear end with a tongue and the said stem being provided with a notch in its end adapted to receive the tongue of said blade.

SAMUEL T. SKEEN.

In the presence of—
    JOHN L. ROBERTSON,
    H. J. SCHNEIDER.